United States Patent [19]

Hanson

[11] Patent Number: 4,493,191
[45] Date of Patent: Jan. 15, 1985

[54] TRANSPORT REFRIGERATION SYSTEM WITH CONTROL FOR TOP FREEZING AVOIDANCE

[75] Inventor: Jay L. Hanson, Bloomington, Minn.

[73] Assignee: Thermo King Corporation, Minneapolis, Minn.

[21] Appl. No.: 579,928

[22] Filed: Feb. 14, 1984

[51] Int. Cl.³ .................... F25B 49/00; G05D 23/19
[52] U.S. Cl. ...................................... 62/126; 62/158; 62/228.5; 62/229; 340/588; 374/103
[58] Field of Search .............. 62/126, 130, 157, 158, 62/231, 155, 234, 229, 228.4, 228.5; 374/102, 103; 340/585, 588, 587, 584; 364/557; 236/46 R, 46 F, 94, 78 B; 165/12

[56] References Cited

U.S. PATENT DOCUMENTS

| | | | |
|---|---|---|---|
| 4,187,093 | 2/1980 | Boratgis et al. | 62/126 |
| 4,251,999 | 2/1981 | Tanaka | 62/157 |
| 4,313,308 | 2/1982 | Boratgis et al. | 62/126 |
| 4,407,139 | 10/1983 | Ide et al. | 62/158 |

FOREIGN PATENT DOCUMENTS 74430  5/1980  Japan ................... 374/103

*Primary Examiner*—Harry Tanner
*Attorney, Agent, or Firm*—E. C. Arenz

[57] ABSTRACT

The circuit arrangement includes a first voltage divider including a temperature sensitive resistance 18 and resistor R1 which feed an analog signal through line 30 to comparators CP1-4, which also receive reference voltages from a second voltage divider comprising R2-5. CP1 goes high with a falling temperature of 26° F. or lower, CP2 goes high when the temperature falls below 22° F. and CP3 goes high when the temperature falls below 18° F. A first timer 20 is turned on when any of the comparators are turned on and counts pulses from an R-C circuit including R8-11 and C1. Whether R8 and 9 are in the oscillator circuit depends upon whether the bilateral switches S2 and S3 controlled by the comparator CP2 and CP3 have shunted them out. Accordingly, the counting is speeded up as the temperature drops. When the variable timer 20 times out the flip-flop 28 is clocked, and the refrigerating capacity is reduced through relay 22 and a duration timer 26 is turned on to time the duration of the reduced refrigerating capacity. At the expiration of the fixed time, the refrigerating capacity is restored, and the timer 20 is turned back on if the discharge air temperature is sufficiently low to call for it to be on. The comparator CP4 functions to detect a shorted sensor 18, and keep the system from working if there is a short.

4 Claims, 4 Drawing Figures

TRANSPORT REFRIGERATION SYSTEM WITH CONTROL FOR TOP FREEZING AVOIDANCE

CROSS-REFERENCE TO RELATED APPLICATION

Barnett U.S. Patent Application Ser. No. 579,930, filed contemporaneously herewith, is a related application.

BACKGROUND OF THE INVENTION

This invention pertains to the art of a transport refrigeration system provided with control apparatus for reducing the probability of top freezing of fresh perishable cargo adjacent the path of refrigerated air discharged from the transport refrigeration unit.

In a trailer or truck hauling perishable food products, a part loss of the cargo occasionally occurs due to freezing the top of the load near the area where the cold air is blown out of the refrigeration unit. Typical practice in the art is to measure only the return air temperature at the inlet to the transport refrigeration unit without regard to the temperature of the air being blown out over the cargo. Thus, while the set point temperature of the unit might be of a value which would indicate top freezing should not occur, the actual temperature of the air being discharged from the unit may be at a significantly lower temperature than the set point temperature.

The related Barnett application discloses and claims a control scheme for reducing the likelihood of top freezing for a transport refrigeration unit of the character having a normal refrigerating capacity in one mode of operation and a reduced refrigerating capacity in another mode, in which time and temperature are effectively integrated so that with progressively lower discharge air temperatures, the period during which the unit operates with normal refrigerating capacity is progressively reduced with progressively lower temperatures.

It is the aim of my invention to provide one particular control arrangement including solid state circuitry for reducing the likelihood of top freezing.

SUMMARY OF THE INVENTION

In accordance with my invention, the control circuit arrangement for controlling the period of operation at a given refrigerating capacity includes first voltage divider means including first temperature responsive resistance means sensing the discharge air temperature and second resistance means, the voltage divider means providing an analog signal in accordance with the sensed temperature; a succession of comparators, each having an terminal connected to receive the analog signals; second voltage divider means providing different reference signals to the other terminals of the comparators in accordance with preselected temperatures at which is desired to change the digital output of said comparators from one state to another state; first timer means including first oscillator means for generating first pulses at a rate dependent upon the state of the outputs from said comparators and first counter means connected to said first oscillator means to receive the pulses; second timer means including second oscillator means for generating second pulses at a predetermined rate, and second counter means connected to said second oscillator means to receive said second pulses; and flip-flop means including a clock input connected through gate means to the outputs of said first and second timer means and operative, in response to a signal from the first timer means indicating a predetermined count to clear the count of said first timer means, actuate counting of said second timer means and to signal for a reduction in refrigerating capacity and, operative, in response to a signal from said second timer means indicating a predetermined count of said second timer means to clear the count of the second timer means, enable the first timer means to resume counting in accordance with the output states of said comparators, and to signal for a restoration of said refrigerating capacity.

DESCRIPTION OF THE PREFERRED EMBODIMENT

Figure 1:
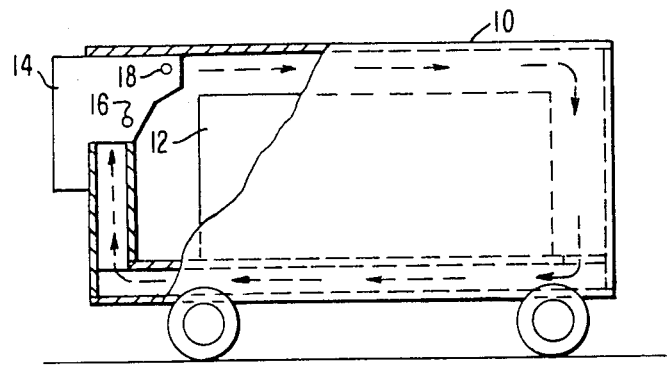
FIG. 1 is a generally diagrammatic side view of a trailer provided with a transport refrigeration unit to illustrate the top freezing problem.

In FIG. 1 a trailer 10 of the type adapted for carrying perishable loads as indicated at 12 is provided with transport refrigeration unit 14 of the type as disclosed in U.S. Pat. No. 4,325,224, for example, and having the capability of operating at what is herein called a normal refrigerating capacity in one mode of operation, and at a reduced refrigerating capacity in another mode. While a reduction in refrigerating capacity can be accomplished in various ways, such as changing the speed of the engine driving the compressor, the description will proceed with what is currently considered to be the preferred form which is unloading the compressor. Of course, it is also within the comtemplation of the invention that the reduction in refrigerating capacity can be obtained by going to a null or an engine shutdown, to eliminate the refrigerating capacity.

The typical air flow through the trailer and around the load is indicated by the directional arrows which shows the air discharged passing across the top of the load 12 and then returning through various path and back up to the inlet of the evaporator part of the unit 14. The symbol 16 in the return air inlet of the unit indicates the return air thermostat which controls the unit operation in accordance with a particular set point temperature. The symbol 18 in the discharge outlet of the unit indicates the discharge air temperature sensor which is used in connection with the invention.

Figure 2:
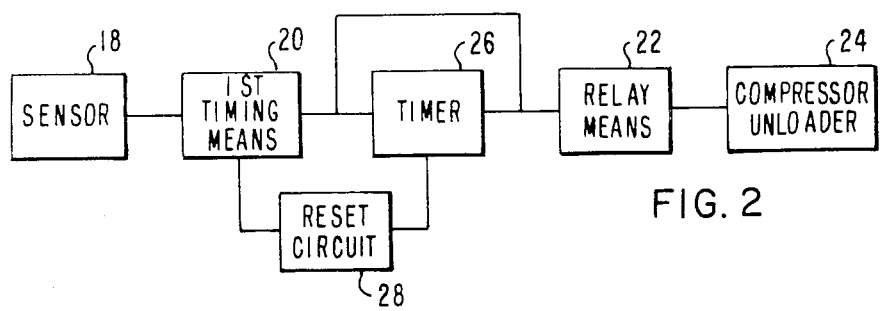
FIG. 2 is a block diagram of a general control arrangement to avoid top freezing.

The basic scheme for avoiding top freezing is illustrated in block diagram form in FIG. 2 and includes a sensor 18 for sensing the temperature of the discharge air and providing a signal reflecting that temperature, a first timing means 20 actuated by the signal and operable in response to the signal indicating a discharge temperature below a predetermined temperature capable of causing top freezing after a given period to provide time periods of progressively shorter duration, with progressively lower sensed temperatures so that when the timing means 20 has accumulated a given number of pulses, relay means 22 for effecting unloading of the compressor through compressor unloader 24 is actuated, as well as duration timing means 26 which times the duration of the reduced refrigerating capacity. Upon the expiration of the time by timer 26, the relay 22 is actuated to go to a normal refrigerating capacity, and through a reset circuit 28 the timing means 20 is enabled to again begin counting if the discharge temperature is in a range which calls for the count.

Figure 3:
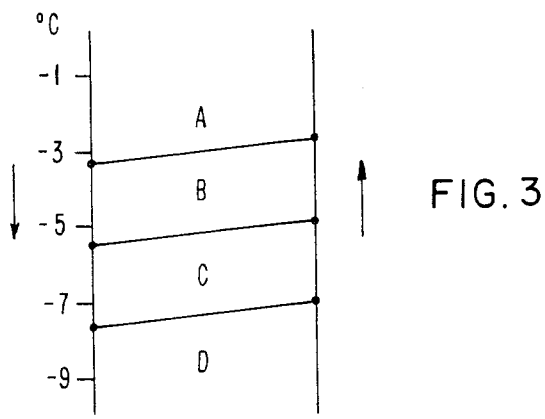
FIG. 3 is a representation for the purposes of explaining timer and counter operation with different falling and rising air discharge temperatures from the unit.

FIG. 3 represents an example of how the system may be set to operate with various temperatures in degrees centigrade of the discharge air, with the temperatures falling on the left hand side of the representation and rising on the right hand side. The temperature selected at which changes in timing occurs are selected for purposes of example only, and the particular periods of time for a timer to time out are also for purposes of example. Also, the number of areas given the letter designations are also somewhat arbitrary, with a greater number of such areas perhaps giving somewhat more precise control. Such preciseness of control is not considered necessary to adequately preclude a top freezing condition.

With a falling discharge air temperature above about $-3.5°$ C., the freeze avoidance system is off. This corresponds to the area having the letter designation A. As the temperature drops below about $-3.5°$ C., the timer 20 is actuated and will accumulate time at a rate of about 60 minutes to time out, the area B indicating this functioning of the timer. If during this period of temperature fails to drop below about $-5.5°$ C., the timer 20 will time out and actuate the relay 22 to obtain reduced refrigerating capacity. If prior to the expiration of the 60 minutes the discharge air temperature drops below about $-5.5°$ C., the timer 20 will speed up its count to a rate of about 35 minutes to time out, the first speeded up rate period corresponding to the area C. If the timer has failed to time out in either area B or C and the discharge air temperature drops to about $-8°$ C. or less, the timer 20 will accumulate time at a rate of 15 minutes to time out, this second speeded up timing corresponding to the area D. In each case as the temperature descends from the B to the D level, the previously accumulated time is kept and will be added to the speeded up count. The same situation prevails with rising temperatures with accumulated time being kept and counting slowed down in moving from one letter area to another. If the temperature should rise from the B to the A area before the timer has timed out, the timer will be turned off and all accumulated time will be cleared. In the currently preferred embodiment, the duration timer 26 functions for a fixed time to have the refrigerating system operate at a reduced capacity and keeping the timer 20 off during this period.

Figure 4:
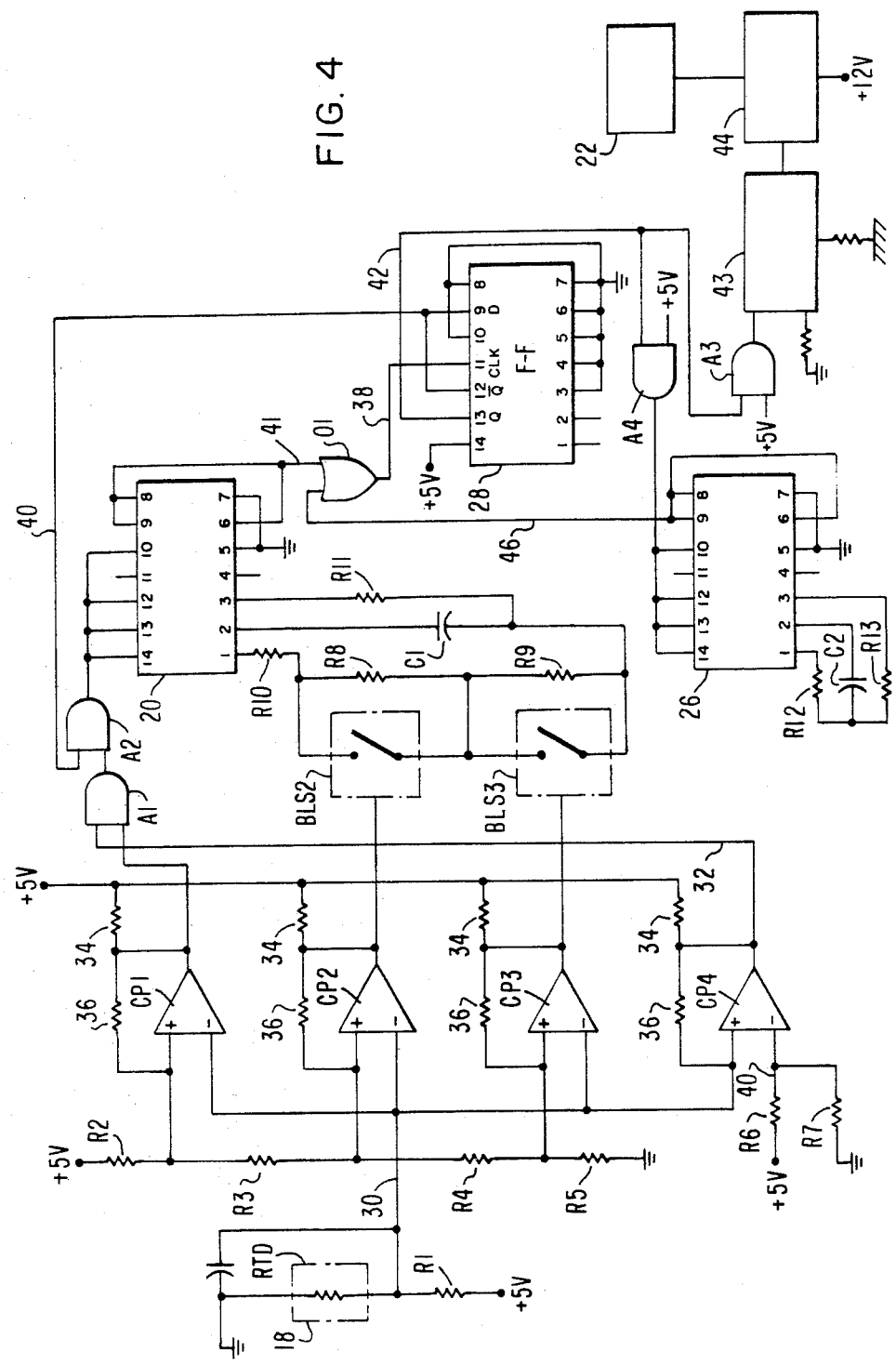
FIG. 4 is a schematic diagram of my particular control circuit arrangement for carrying out the invention.

FIG. 4 is a schematic of my particular control arrangement RTD, standing for a resistance temperature device, is a positive temperature coefficient resistance which is positioned in the discharge air outlet as indicated by numeral 18 in FIG. 1 and is thus responsive to the discharge air temperature. For purposes of the embodiment to be described herein, the RTD may be a model S400 of Minco Products, Inc., and has a resistance of about 792 ohms at $-20°$ F. ($-29°$ C.) and a resistance of about 1025 ohms at 80° F. (26° C.). The approximate temperature values selected at which the timer is to begin counting is about 26° F. ($-3.3°$ C.) and with the counting speeded up at approximately 22° F. ($-5.6°$ C.) and speeded up further at 18° F. ($-7.8°$ C.). Thus, the resistance R1 in the first voltage divider comprising RTD and R1 is selected, in accordance with the resistances R2-5 in the second voltage divider network providing reference signals, so that with a falling temperature the analog signal in line 30 received by CP1 will switch CP1 on with the discharge air temperature sensed by RTD falling to 26° F. ($-3.3°$ C.) or below. Likewise, when the analog signal from the first voltage divider is of a value corresponding to a falling temperature of the discharge air flow of 22° F. ($-5.6°$ C.), comparator CP2 will change state, and with CP3 changing state when the analog signal corresponds to a falling discharge air temperature of 18° F. ($-7.8°$ C.) or below. Since the system functions in the relatively narrow range of about 8° F. (4.4° C.) the resistors R3 and R4 are selected to have very low resistance values as compared to resistors R2 and R5.

CP4 is for the purpose of monitoring the sensor RTD to ensure that the system will be prevented from working if RTD is shorted. This is accomplished by providing an analog signal through the line 30 to the positive terminal of CP4 and by providing a reference signal from the bridge which includes R6 and R7 with the latter resistor being of a relatively low value compared to the former resistor. If the sensor RTD is shorted, CP4 will go from one state to the other, as shown from high to low, which will be fed through line 32 to AND gate A1.

The comparators, which may be MM74C909 quad comparators, are open collector devices which require pullup resistors 34. Feedback resistors 36 are also associated with each of the comparators to set the fixed hysteresis for the comparators.

In the illustrated arrangement, the analog signal from line 30 is fed to the negative terminals of comparators CP1–CP3 and the comparators go from low to high as the temperature drops to the temperatures noted in connection with each of the comparators.

It is noted that while CP4 will only work to disable the system if RTD is shorted, if RTD is open, the system will also be disabled since this will correspond to a condition of a high temperature discharge air.

The outputs of CP2 and CP3 are connected to and control the functions of bilateral switches BLS2 and BLS3, respectively, the switches selected for this particular control arrangement being CD4066BC quad bilateral switches. The switches are paralleled by resistors R8 and R9 with the common of BLS2 and R8 being connected to resistor R10, and the common of BLS3 and R9 being connected to resistor R11. Capacitor C1 also has one side connected to the common of BLS3 and R9.

The part of the circuit which basically performs the function of the variable timer 20, and which is so indicated in FIG. 4, is a CD4541BC programmable timer which can provide an oscillator, counter and flip-flop function in one integrated circuit. The frequency of the oscillator arrangement is determined by the resistor-capacitor network of R8-R11, C1, and the position of the switches BLS2 and 3. The input to the variable timer 20 is from any output of AND gate A2 and the output of the timer is to OR gate O1. With the particular timer selected, pins 12 and 13 of the timer determine the number of oscillations to count before the output at pin 8 changes state. Both pins 12 and 13 are high for the maximum count of 65536. Pins 9, 6 and 5 determine the state of pin 8 at initial start-up and after the predetermined count has been reached.

The reset arrangement includes a CD4013BC Dual flip-flop and is also indicated by the numeral 28 in FIG. 4.

The fixed duration timer generally indicated 26 in FIG. 4 may be the same device as the variable timer 20.

The flip-flop is set up to change states at $\bar{Q}$ and Q when a positive clock pulse is received from the output of O1 through line 38. With initial power on, $\bar{Q}$ will be high and Q low. With $\bar{Q}$ high, the one terminal of AND gate A2 will be high through line 40. If the sensor RTD is not shorted, the input to AND gate A1 from line 32 will also be high. The other input of AND gate A1 will be low until the discharge air temperature reaches 26° F. (−3.3° C.) or less at which time the output of comparator CP1 goes high so that both of the inputs of AND gate A1 are high. Its output will then go high and at this time both inputs of AND gate A2 will be high and the output of A2 will power up the timer 20 and start the oscillator and internal counter. So long as the discharge air temperature remains in the B temperature range of FIG. 3, the oscillation frequency will be determined by all of the resistors R8–R11 and the capacitor C1. If the temperature should rise back into the A area of FIG. 3, the power will be removed from timer 20 and the oscillator will stop and the counter cleared.

If the discharge air temperature remains in the B area for a period of about one hour, the timer 20 will have timed out with the maximum number of counts of the timer. At this point, the output of the timer through line 41 to one input of OR gate O1 will go high and the flip-flop 28 will be clocked from the output of O1 through line 38. Q will go from low to high and feed that signal through line 42 to one terminal of AND gate A3, whose other terminal is already high, the output of A3 being to an optoisolator 43 such as an HIIG1 which in turn drives a power Darlington transistor 44 such as a TIP127 which in turn connects to the relay coil 22. The opto-isolator and Darlington transistor are to provide for isolation between the 5 volt system of the logic circuit and the 12 volt system used to power the relays and other parts of the transport refrigeration system. The output to the relay 22 will cause it to switch to a position of reduced refrigerating capacity.

The output signal through line 42 also passes to AND gate A4, whose other input is connected to the supply voltage, so that A4 will go high and a fixed timer 26 will be started. At the same time that the fixed timer is started, the variable timer 20 will have power removed therefrom through $\bar{Q}$ going from high to low and causing AND gate A2 to go low.

The frequency of the fixed timer 26 is determined by the values of the RC oscillator circuit including resistors R12 and R13 and capacitor C2. As currently contemplated, the values of these components are selected to provide a time period for the fixed timer of about 30 minutes during which the transport refrigeration unit operates at a reduced refrigerating capacity. After the fixed timer has timed out, the output therefrom through line 46 to OR gate O1 which will again provide a signal through line 38 to clock the flip-flop and cause Q and $\bar{Q}$ to again change states to low and high, respectively, so that the relay 22 is operated to the normal refrigerating capacity position and variable timer 20 will be in a position to be again powered if the discharge air is still less than 26° F. (−3.3° C.), and the duration timer 26 will be turned off.

The same general sequence of events occurs, but with different timing depending upon whether CP2 and/or CP3 turn on due to sensed temperatures in the C and D range (FIG. 3). Thus, if in some period of time less than an hour the discharge air temperature has dropped to 22° F. (−5.6° C.) or less, CP2 will turn on and cause switch BLS2 to close, thereby shorting out resistor R8. This will speed up the count of the timer 20 in accordance with the reduction in resistance value of the R-C oscillator circuit and will cause the variable timer 20 to time out in some period less than an hour. Likewise, if before the variable timer 20 has timed out the temperature drops to 18° F. (−7.8° C.) or less, the count of the variable timer 20 will be further speeded up due to shorting out of the resistance R9.

What is claimed is:

1. For a top freezing avoidance arrangement for a transport refrigeration system in which air discharge temperature capable of causing top freezing of a fresh load are sensed and control the period of operation at a given refrigerating capacity in accordance with the level of temperature of the air discharged, a circuit arrangement for effecting said control comprising:

first voltage divider means including first temperature responsive resistance means sensing said discharge air temperature and second resistance means, said voltage divider means providing an analog signal in accordance with the sensed temperature;

a succession of comparators, each having one terminal connected to receive said analog signals;

second voltage divider means providing different reference signals to the other terminals of said comparators in accordance with preselected temperatures at which it is desired to change the digital output of said comparators from one state to another state;

first timer means including first oscillator means for generating first pulses at a rate dependent upon the state of the outputs from said comparators and first counter means connected to said first oscillator means to receive said pulses;

second timer means including second oscillator means for generating second pulses at a predetermined rate, and second counter means connected to said second oscillator means to receive saids second pulses;

flip-flop means including a clock input connected through gate means to the outputs of said first and second timer means an operative, in response to a signal from said first timer means indicating a predetermined count, to clear the count of said first timer means, actuate counting of said second timer means and to signal for a reduction in refrigerating capacity and, operative, in response to a signal from said second timer means indicating a predetermined count of said second timer means, to clear the count of said second timer means, enable said first timer means to resume counting in accordance with the output states of said comparators, and to signal for a restoration of said refrigerating capacity.

2. A circuit arrangement according to claim 1 wherein:

said first oscillator means comprises a R-C oscillator circuit including a number of resistances in series, and means for eliminating selected ones of said resistance from said R-C oscillator circuit in accordance with changes in state of said comparators.

3. A circuit arrangement according to claim 1 including:
means for sensing a failure of said first temperature responsive resistance means and for disabling said control circuit in response thereto.

4. A circuit arrangement according to claim 3 wherein:
said failure sensing means includes an additional comparator receiving said analog signal.

* * * * *